Patented Aug. 21, 1923.

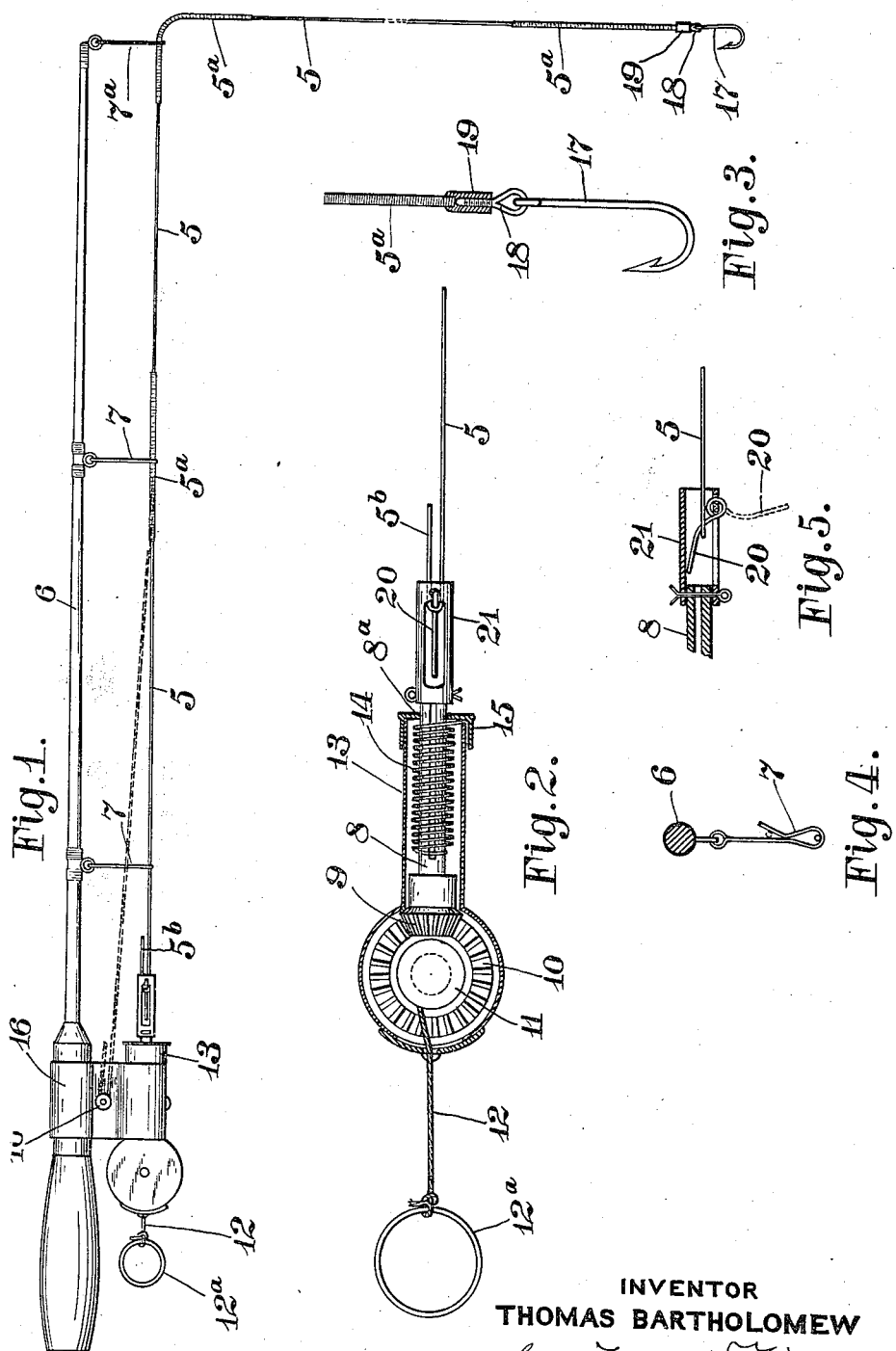

1,465,707

UNITED STATES PATENT OFFICE.

THOMAS BARTHOLOMEW, OF COLUMBUS, OHIO.

FISHING TACKLE.

Application filed January 17, 1923. Serial No. 613,277.

*To all whom it may concern:*

Be it known that I, THOMAS BARTHOLOMEW, a citizen of the United States, residing at Columbus, in the county of Franklin and State of Ohio, have invented a certain new and useful Improvement in Fishing Tackle, of which the following is a specification.

This invention relates more particularly to apparatus for what might be called "still fishing."

Disciples of Isaak Walton are generally agreed that in the piscatorial world edibility is an incident of motion. An impaled angle worm soon loses its power to wiggle hence the more astute fishermen experienced in the use of that species of bait either frequently rebait or move the defunct bait about in the water with a view to attracting the game. But moving the bait about by the ordinary method involves much movement of the rod and line and this, I think, tends to frighten the finny creatures. The motion should be confined as much as possible to the baited hook. It has heretofore been proposed to twirl the hook by using a line that can be wound upon a reel but the difficulty with a line that can be so wound is that it lacks torsional rigidity. Plain metal wire, if of ample gage, has sufficient of this sort of rigidity but it lacks flexibility. It is therefore one of the objects of my invention to provide a line possessing both torsional rigidity and axial flexibility so that it can be rotated on its axis throughout its length with little or no lateral movement and thereby impart a rotary motion to the hook. Another object of the invention is to provide means whereby the line may, in most instances, be detached from the hook at its connection therewith if the latter becomes snagged in submerged and inaccessible objects such as logs and rocks. Other objects can be gathered from the disclosure herein.

The invention is embodied in the example herein shown and described the features of novelty being finally claimed.

In the accompanying drawing—

Figure 1 illustrates a rod, the line and the line operating devices according to my invention.

Fig. 2 is a longitudinal sectional view on a larger scale illustrating the line operating mechanism.

Fig. 3 shows in sectional view the method of connecting the hook to the line.

Fig. 4 illustrates a section of the rod containing a threading eye for the line.

Fig. 5 is a sectional view of the means for connecting the line to the rotating mechanism.

The line is composed of sections 5 of rather stiff plain wire preferably of steel or brass connected with alternating shorter lengths $5^a$ of Bowden or closely coiled fine wire. Such Bowden wire is quite flexible longitudinally but is stoutly resistant torsionally, and when rotary motion is imparted to one end of a line so constructed it is effectively conducted to the other even though the line be angled sharply as at the outer end of the rod. Such a line is ill adapted for reeling but can be compacted in sheaf fashion by folding the stiff parts together, the flexible portions $5^a$ readily admitting of this.

The rod 6 to sustain the line can be of ordinary form, but I prefer to equip it with snap hooks 7 into the eyes of which the line can be sprung laterally as suggested in Fig. 4.

The rear end of the line is removably connected to a shaft 8 by means of a pivoted bent tongue 20 in a sleeve 21 secured by a cotter pin to the shaft 8. The bent tongue is permitted to fall to the dotted line position by shoving the hooked end of the line inward after which said hooked end can be withdrawn.

The shaft 8 is journaled in a bearing $8^a$ and is provided with a bevel pinion 9 engaged by a large bevel gear wheel 10 the shaft of which contains a reel 11 to which is attached a suitable length of pull cord 12 having a finger pull ring $12^a$ for rotating said reel. The shaft 8 is partly confined in a tube 13 and attached to it is one end of a coil spring 14 the other end thereof being confined and held between tube 13 and a removable cap 15. The spring 14 is so arranged and secured that when the cord 12 is mostly wound on the reel the spring is relaxed, hence, when the cord is pulled out it rotates the fishing line on its axis in one direction, the spring being put under tension; hence when the cord 12 is relaxed it is rewound and the fishing line rotated by the exertion of the spring in the opposite direction. The casing containing the rotating mechanism can be attached to the rod near the handle as shown, or if more extension of the line is wanted for deeper fishing it can be attached farther up on the rod by means of the clamp 16 having a screw 16ª, the cord being made long enough to permit the operation of the mechanism when its position on the rod is thus changed.

The fish hook, designated 17, has connected to it a screw eye 18 that engages a screw socket 19 on the free or outer end of the line. If the hook becomes snagged, as before suggested, and resists all usual and reasonable efforts to dislodge it, it alone can be disconnected and abandoned and the line saved by steadily and firmly turning the line with the fingers of the hand in the unscrewing direction of the threading connection of the screw eye and socket. This operation can be greatly facilitated by disconnecting the inner hooked end 5ᵇ of the line from the rotating shaft 8 and the nearer snap 7 and securing it under the head of the clamp screw 16ª, as indicated in broken lines Fig. 1 and bodily turning the rod and therefore the line. The line sustaining member 7ª at the outer end of the rod is shown as loosely hung but it preferably has a closed eye, the line being threaded through said eye as in ordinary practice thus preventing its possible separation from the rod at that point during the excitement of a struggle with a good catch.

The forms of the parts can be changed without departing from the gist of the invention as claimed.

What I claim is:

1. A fishing line composed of a plurality of connected torsionally resistant and relatively stiff and flexible portions alternately occurring in the line.

2. A fishing line constructed of torsionally resistant material and a fishing hook having screw threaded means for connecting it to the line whereby the line may be rotated to detach the hook if snagged.

3. A fishing line constructed of torsionally resistant material and releasable means for connecting a fish hook thereto, said means being adapted to be operated by torsionally twisting the line to detach the hook when snagged.

4. In a fishing apparatus, the combination of a fishing line adapted to be rotated on its axis and means for rotating the line including a rotary member to which the line may be attached, a spring connected with said member and a fixed part and means for rotating the rotary member in one direction to rotate the line in the corresponding direction and to place the spring under tension for rotating the line in the opposite direction.

5. In a fishing apparatus, the combination of a fishing line adapted to be rotated on its axis and means for rotating the line including a rotatable member to which the line may be attached, manually operable means for turning said member and line in one direction, a spring adapted to be tensioned to rotate the line in the opposite direction, said spring connected with the rotating means and a fixed part and adapted to be tensioned by the operation of the said manually operable means to turn the line in the first mentioned direction.

THOMAS BARTHOLOMEW.